United States Patent [19]

Kashiwase

[11] Patent Number: 4,748,941
[45] Date of Patent: Jun. 7, 1988

[54] COOLING SYSTEM FOR AN ENGINE

[75] Inventor: Hajime Kashiwase, Tokyo, Japan

[73] Assignee: Fuji Jukogyo Kabushiki Kaisha, Tokyo, Japan

[21] Appl. No.: 68,542

[22] Filed: Jun. 29, 1987

[30] Foreign Application Priority Data

Jun. 30, 1986 [JP] Japan .................... 61-153215

[51] Int. Cl.4 .................................... F01P 7/16
[52] U.S. Cl. .................... 123/41.1; 236/34.5
[58] Field of Search ........... 123/41.05, 41.08, 41.09, 123/41.1; 236/34.5, 101 C

[56] References Cited

U.S. PATENT DOCUMENTS

| | | | |
|---|---|---|---|
| 3,877,443 | 4/1975 | Henning et al. | 123/41.08 |
| 4,196,847 | 4/1980 | Gabien | 236/34.5 |
| 4,410,133 | 10/1983 | Furokubo | 236/34.5 |
| 4,425,877 | 1/1984 | Fritzenwenger et al. | 123/41.1 |
| 4,606,302 | 8/1986 | Huemer et al. | 123/41.1 |

FOREIGN PATENT DOCUMENTS 57-83225 5/1982 Japan .

Primary Examiner—Tony M. Argenbright
Attorney, Agent, or Firm—Martin A. Farber

[57] ABSTRACT

A cooling system for an engine with a thermostat having a primary valve and a secondary valve. The thermostat is provided in a housing. The housing has a first chamber, a second chamber, and a bypass passage formed in a wall between the first and second chamber for communicating the first chamber with the second chamber. The first chamber has an inlet communicated with an outlet of water jackets of an engine, and an outlet communicated with a radiator. The second chamber has an inlet communicated with the radiator and an outlet communicated with an inlet of the water pump. The primary valve is provided for closing the outlet of the first chamber at low temperature of coolant and the secondary valve is provided for closing the bypass passage at high temperature of the coolant.

2 Claims, 3 Drawing Sheets

COOLING SYSTEM FOR AN ENGINE

BACKGROUND OF THE INVENTION

The present invention relates to a cooling system for an engine, and particularly for an automotive engine.

Generally, in the cooling system, the coolant is circulated from a water pump passing through water jackets of an engine and a radiator when a thermostat valve opens. In a conventional cooling system for an automotive engine, a thermostat is disposed in a coolant passage near an outlet of water jackets of the engine. Such a system is disclosed in Japanese Utility Model Application Laid Open No. 57-83225. Further, there has been a cooling system in which a thermostat is disposed in a coolant passage near an inlet of a water pump.

However, in the former system, when the temperature of coolant in the engine reaches a predetermined opening temperature of the thermostat, the thermostat valve opens immediately. Since the low temperature coolant from a radiator flows into the water jackets, the temperature of coolant in the water jackets is rapidly lowered to decrease the temperature of the engine. The thermostat senses the decrease of the temperature of coolant at the outlet position of the water jackets and the thermostat valve is closed. Thus, the temperature of coolant in the water jackets is remarkably changed by the operations of the thermostat. Such a rapid variation of coolant temperature affects the engine.

In the latter system, since a thermo-sensitive device of the thermostat is disposed upstream of the water pump, temperature of the coolant entering into the water jackets is controlled to a constant value. However, the thermostat has a large conduit resistance, so that the efficiency of the water pump is reduced. In order to improve the efficiency of the pump, the thermostat and water pump should be made large in size and capacity. Further, when the water pump is driven at high speed, the pressure in the passage between the thermostat and the water pump becomes low because of the large conduit resistance, so that cavitation occurs in the water pump.

Accordingly, it is preferable to dispose a thermo-sensitive device at the inlet of the water pump so as to sense the temperature of the coolant at an inlet side of the water pump and to dispose a valve device at the outlet of water jackets of the engine, so that the above described disadvantages in the prior art may be eliminated.

SUMMARY OF THE INVENTION

An object of the present invention is to provide a cooling system for an automobile engine which may prevent rapid variation of coolant temperature and reduce the conduit resistance, for improving the operability of the system.

Another object of the present invention is to provide a thermostat having a small size for decreasing the dimension of the system with low cost.

According to the present invention, there is provided a cooling system for an engine with a thermostat having a frame having a primary valve seat, a rod secured to the frame, a guide member slidably mounted on the rod, a primary valve secured to the guide member, a heat conductive cylinder secured to the guide member, a wax provided in the cylinder, and a secondary valve secured to the guide member. The system comprises a radiator, a water pump an outlet of which is communicated with an inlet of water jackets of the engine, a housing securing the frame of thermostat therein, the housing having a first chamber, a second chamber, and a bypass passage formed in a wall between the first and second chamber for communicating the first chamber with the second chamber, the first chamber having a first inlet communicated with an outlet of the water jackets of the engine, and a first outlet communicated with an inlet of the radiator, the second chamber having a second inlet communicated with an outlet of the radiator and a second outlet communicated with an inlet of the water pump, the primary valve being provided for closing the first outlet and the secondary valve being provided for opening the bypass passage at low temperature of coolant, the primary valve being provided for opening the first outlet and the secondary valve being provided for closing the bypass passage at high temperature of the coolant.

In an aspect of the invention, the first chamber has a third outlet which is communicated with an inlet of a heater and the second chamber has a third inlet communicated with an outlet of the heater.

The other objects and features of this invention will be apparently understood from the following description with reference to the accompanying drawings.

DETAILED DESCRIPTION OF THE PREFERRED EMBODIMENTS

Figure 1:
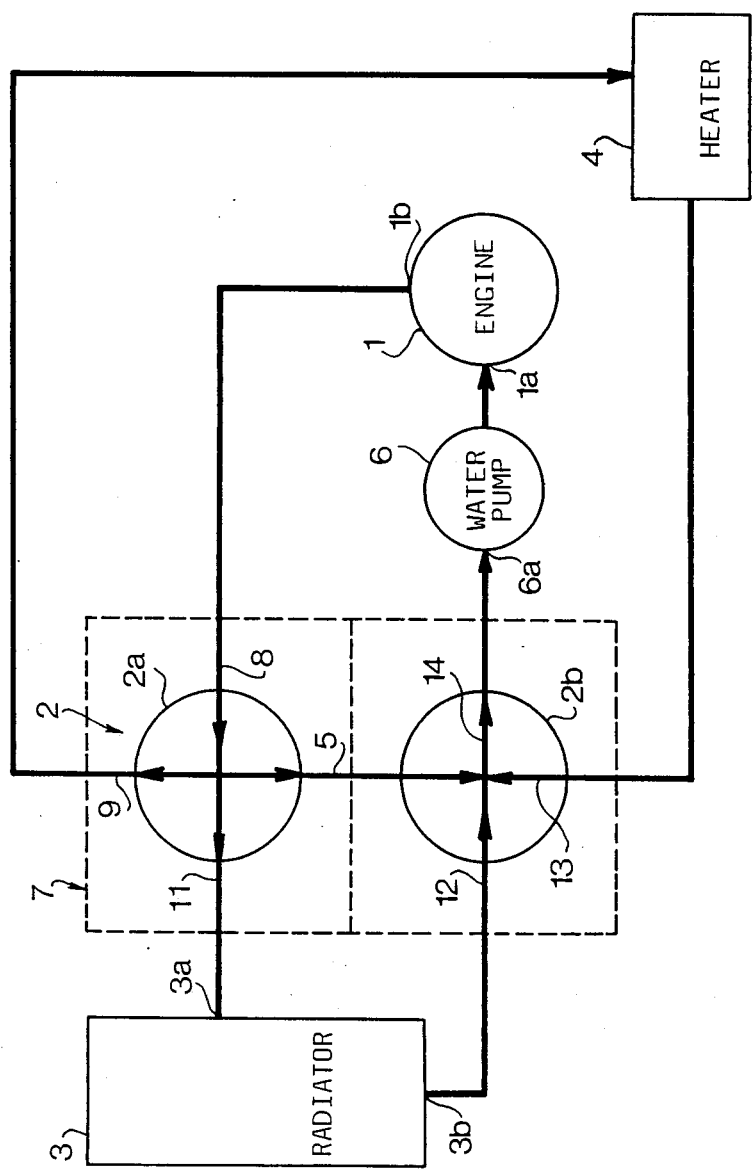
FIG. 1 is a schematic block diagram showing circulations of coolant in an engine cooling system according to the present invention.

Referring to FIG. 1, a cooling system for an automobile engine according to the present invention comprises a water pump 6 connected to an inlet 1a of water jackets of an engine 1, a thermostat 2 disposed in a coolant passage between an outlet 1b of the water jackets of the engine 1 and an inlet 3a of a radiator 3. The thermostat 2 consists of a valve control device 2a and a thermo-sensitive device 2b, which will be explained more in detail hereinafter. A bypass passage 5 is provided between both devices 2a and 2b and bypasses the radiator 3. Coolant is circulated as shown by arrows. More particularly, the coolant from the water jackets of the engine 1 is circulated to the radiator 3 and a heater 4 through the control device 2a and thermo-sensitive device 2b of the thermostat 2, or circulated passing through the bypass passage 5. The coolant from the radiator 3 is supplied to the water jackets of the engine 1 by the water pump 6, through the thermo-sensitive device 2b, together with the coolant from the heater 4.

Figure 2:
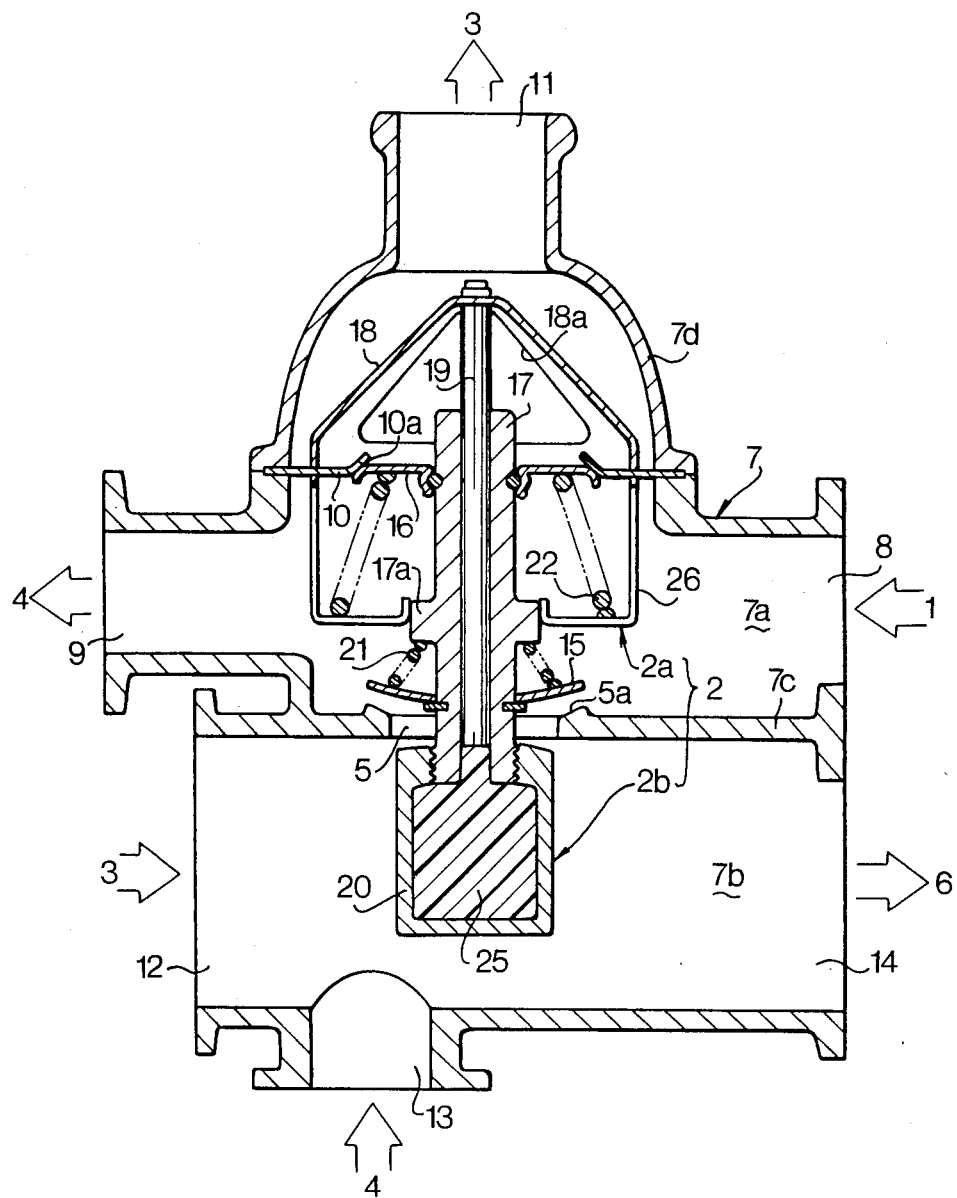
FIG. 2 is a sectional side view of a thermostat of the present invention in cold engine state.

Explaining more in detail with reference to FIG. 2, a thermostat housing 7 has an upper chamber 7a, a lower chamber 7b defined by a partition 7c, and a cap 7d for securing the thermostat 2 to the housing 7. The bypass passage 5 is formed in the partition 7c. The upper chamber 7a has an inlet 8 connected to outlet 1b of water jackets of the engine 1, and an outlet 9 connected to an inlet of the heater 4. An outlet 11 formed on the cap 7d is connected to inlet 3a of the radiator 3. The lower chamber 7b has an inlet 12 connected to an outlet 3b of the radiator 3, an inlet 13 connected to an outlet of the heater 4, and an outlet 14 connected to an inlet 6a of the water pump 6.

The thermostat 2 is mounted in the thermostat housing 7 in such a manner that the valve control device 2a is disposed in the upper chamber 7a and the thermo-sensitive device 2b is disposed in the lower chamber 7b. The valve control device 2a comprises a flange 10 secured to the housing 7 by the cap 7d, and forming primary valve seat 10a, an upper frame 18 and a lower frame 26 secured to the flange 10, a rod 19 secured to the upper frame 18, and a cylindrical guide member 17 slidably mounted on the rod 19. An opening 18a is formed in the wall of the upper frame 18. The guide member 17 has a lateral projecting portion 17a to be slidably engaged with an inside wall of an opening formed in the bottom of the frame 26. A lower end of the guide member 17 is extended to the lower chamber 7b through the bypass passage 5. A heat conductive cylinder 20 is integrally secured to the lower end of the guide member 17. A wax 25 is charged in the cylinder 20. A primary valve 16 is fixed to the guide member 17 to be engaged with the valve seat 10a on flange 10. A return coil spring 22 disposed surrounding the guide member 17 is provided between the primary valve 16 and the bottom of the lower frame 26. A secondary valve 15 is secured to the guide member 17 at a lower portion thereof to be engaged with a valve seat 5a to close the bypass passage 5. A coil spring 21 is provided between the secondary valve 15 and projecting portion 17a.

In operation, as shown in FIG. 2, when the engine 1 is cold, that is, when the temperature of the coolant is low below a predetermined operating temperature, the wax 25 in the cylinder 20 contracts. Accordingly, guide member 17 is upwardly moved along the rod 19. Thus, the primary valve 16 is pushed against the valve seat 10a to close the opening of the flange 10, while the secondary valve 15 is disengaged from the valve seat 5a so that the bypass passage 5 is opened. Since the primary valve 16 closes, the coolant from the engine 1 does not enter into the radiator 3. The coolant is circulated passing through the inlet 8, upper chamber 7a, outlet 9, the heater 4, inlet 13, and lower chamber 7b. Another flow of the coolant circulates passing through the bypass passage 5 and lower chamber 7b. Thus, these flows of coolants are drawn into the water pump 6 through a confluent portion of the lower chamber 7b.

Figure 3:
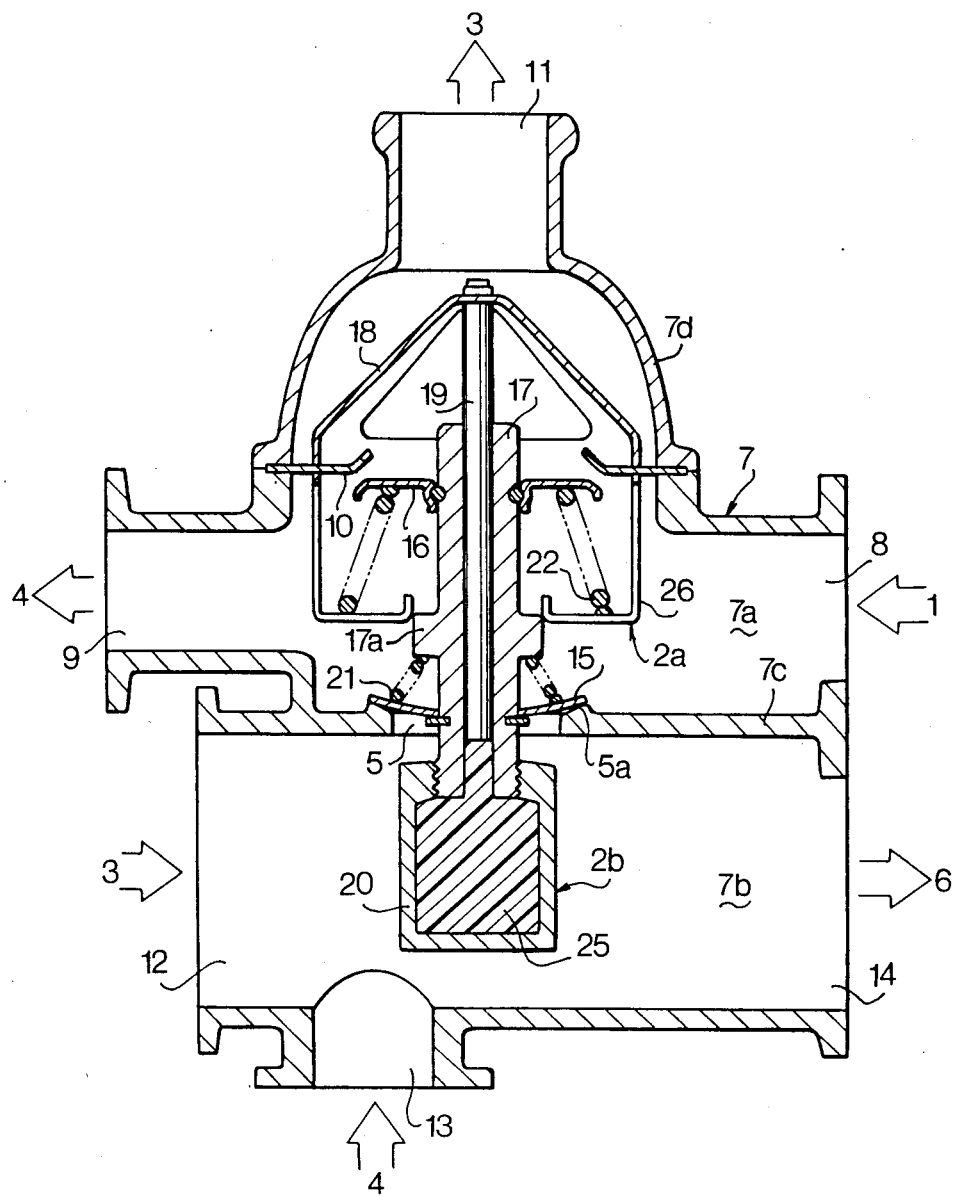
FIG. 3 is a sectional view of the thermostat in hot engine state above a normal operating temperature of the thermostat.

Referring to FIG. 3, when the temperature of the coolant rises, the wax 25 expands to push up the rod 19. However, since the rod 19 is fixed to the frame 18, the thermo-sensitive cylinder 20 moves downward togehter with the guide member 17, thereby opening the primary valve 16 and closing the secondary valve 15 to close bypass passage 5. Accordingly, the coolant from the water jackets of the engine 1 flows into the radiator 3 through the inlet 8, upper chamber 7a, and outlet 11. Another flow of the coolant passes to the heater 4 through the outlet 9. The coolants from the radiator 3 and the heater 4 are inducted into the lower chamber 7b through the inlets 12 and 13, respectively, and supplied to the engine 1 by the water pump 6. When the temperature of the coolant drops below the operating temperature, thermo-sensitive cylinder 20 rises to close the primary valve 16 and to open the secondary valve 15. Thus, the temperature of the coolant is kept constant.

From the foregoing, it will be understood that the present invention provides a thermostat having a valve control device and a thermo-sensitive device. These devices are integrally formed in such a manner that the valve control device is disposed in the coolant passage downstream of the outlet of the water jackets of the engine and the thermo-sensitive device is disposed upstream of the inlet of the water pump. Therefore, a resistance of coolant flow of upstream of the water pump can be reduced, because thermo-sensitive device 2b of the thermostat 2 is positioned upstream of the water pump 6. Accordingly, the efficiency of the water pump with a small size is improved and the cavitation in the water pump is prevented. Further, since it is unnecessary to make the thermostat in a large size, respective parts become small in size, thereby decreasing the size of the system and reducing the manufacturing cost.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. A cooling system for an engine with a thermostat having a frame having a primary valve seat, a rod secured to the frame, a guide member slidably mounted on the rod, a primary valve secured to the guide member, a heat conductive cylinder secured to the guide member, a wax provided in the cylinder, and a secondary valve secured to the guide member, the system comprising:

a radiator;

a water pump an outlet of which is communicated with an inlet of water jackets of the engine;

a housing securing the frame of the thermostat therein;

the housing having a first chamber, a second chamber, and a bypass passage formed in a wall between the first and second chamber for communicating the first chamber with the second chamber;

the first chamber having a first inlet communicated with an outlet of the water jackets of the engine, and a first outlet communicated with an inlet of the radiator, the second chamber having a second inlet communicated with an outlet of the radiator and a second outlet communicated with an inlet of the water pump;

said primary valve being provided for closing the first outlet and said secondary valve being provided for opening the bypass passage at low temperature of coolant; and said primary valve being provided for opening the first outlet and said secondary valve being provided for closing the bypass at high temperature of the coolant.

2. The system according to claim 1 wherein the first chamber has a third outlet which is communicated with an inlet of a heater and the second chamber has a third inlet communicated with an outlet of the heater.

* * * * *